US010512009B2

(12) United States Patent
Wang et al.

(10) Patent No.: US 10,512,009 B2
(45) Date of Patent: Dec. 17, 2019

(54) METHOD FOR USER EQUIPMENT TO SWITCH BASE STATION, BASE STATION AND USER EQUIPMENT

(71) Applicant: ZTE CORPORATION, Shenzhen (CN)

(72) Inventors: Xin Wang, Shenzhen (CN); Feng He, Shenzhen (CN)

(73) Assignee: ZTE CORPORATION (CN)

( * ) Notice: Subject to any disclaimer, the term of this patent is extended or adjusted under 35 U.S.C. 154(b) by 205 days.

(21) Appl. No.: 15/508,194

(22) PCT Filed: Mar. 19, 2015

(86) PCT No.: PCT/CN2015/074644
§ 371 (c)(1),
(2) Date: Mar. 2, 2017

(87) PCT Pub. No.: WO2015/184889
PCT Pub. Date: Dec. 10, 2015

(65) Prior Publication Data
US 2017/0289879 A1 Oct. 5, 2017

(30) Foreign Application Priority Data
Sep. 2, 2014 (CN) .......................... 2014 1 0444560

(51) Int. Cl.
H04W 4/00 (2018.01)
H04W 36/08 (2009.01)
(Continued)

(52) U.S. Cl.
CPC ........... H04W 36/08 (2013.01); H04L 5/0055 (2013.01); H04W 36/0069 (2018.08);
(Continued)

(58) Field of Classification Search
CPC ..... H04W 36/08; H04W 36/14; H04W 84/12; H04W 36/0055; H04W 36/22
See application file for complete search history.

(56) References Cited

U.S. PATENT DOCUMENTS 8,213,386 B2   7/2012  Voyer et al.
8,615,241 B2  12/2013  Gupta et al.
(Continued)

FOREIGN PATENT DOCUMENTS

CN    101557623 A    10/2009
CN    102823295 A    12/2012
(Continued)

OTHER PUBLICATIONS

European Search Report dated Aug. 16, 2017 for EP Application No. 15803810.9 (14pp).
(Continued)

Primary Examiner — Atique Ahmed
(74) Attorney, Agent, or Firm — McDonald Hopkins LLC

(57) ABSTRACT

Methods for switching an eNB by a user equipment, eNBs and user equipments relate to a mobile communication system deployed in a heterogeneous network. The embodiments of the present disclose a method for switching an eNB by a UE, including: when a master eNB of the UE in dual connectivity is switched, a target eNB determining that the UE keeps a connection and configuration with a secondary eNB; and the target eNB establishing a connection with the UE when the UE keeps the connection and configuration with the secondary eNB. The embodiments of the present disclosure further disclose other three methods for switching the eNB by the UE and corresponding eNBs and user equipments.

11 Claims, 6 Drawing Sheets

(51) Int. Cl.
H04W 76/27 (2018.01)
H04W 76/15 (2018.01)
H04L 5/00 (2006.01)
H04W 36/00 (2009.01)
H04W 88/06 (2009.01)
H04W 88/08 (2009.01)

(52) U.S. Cl.
CPC .......... H04W 76/15 (2018.02); H04W 76/27 (2018.02); *H04W 88/06* (2013.01); *H04W 88/08* (2013.01)

(56) References Cited

U.S. PATENT DOCUMENTS

| | | | | |
|---|---|---|---|---|
| 2008/0031159 | A1* | 2/2008 | Jokinen | H04W 36/0033 370/255 |
| 2008/0137607 | A1* | 6/2008 | Ju | H04W 24/04 370/331 |
| 2012/0243461 | A1* | 9/2012 | Bucknell | H04W 36/02 370/315 |
| 2014/0004862 | A1* | 1/2014 | Ekemark | H04W 72/06 455/443 |
| 2014/0211756 | A1* | 7/2014 | Bontu | H04W 36/04 370/331 |
| 2015/0055620 | A1* | 2/2015 | Vesterinen | H04W 36/18 370/331 |
| 2015/0055621 | A1* | 2/2015 | Koskinen | H04W 36/18 370/331 |
| 2015/0071250 | A1 | 3/2015 | Dai et al. | |
| 2015/0111580 | A1* | 4/2015 | Wu | H04W 36/0005 455/436 |
| 2015/0264621 | A1* | 9/2015 | Sivanesan | H04W 36/0069 455/436 |
| 2016/0286449 | A1* | 9/2016 | Choi | H04W 36/28 |
| 2016/0337914 | A1* | 11/2016 | Hoffmann | H04W 36/0083 |

FOREIGN PATENT DOCUMENTS

| | | | |
|---|---|---|---|
| CN | 103428788 | A | 12/2013 |
| CN | 104301955 | A | 1/2015 |
| EP | 3035735 | A1 | 6/2016 |
| JP | 2010183645 | A | 8/2010 |
| WO | 2013143613 | A1 | 10/2013 |
| WO | 2015115761 | A1 | 8/2015 |

OTHER PUBLICATIONS

NTT Docomo et al: "Introduction of Dual Connectivity", Introduction of-Dual Connectivity, 3rd Generation Partnership Project (3GPP), Mobile Competence Centre; vol. RAN WG2, No. Dresden, Germany; Aug. 18, 2014-Aug. 22, 2014, Aug. 17, 2014; Retrieved from the Internet on Aug. 17, 2014: URL: http://www.3gpp.org/ftp/Meetings_3GPP_SYNC/Ran/RAN3/Docs/.

Ericsson: "Dual connectivity—mobility scene", 3rd Generation Partnership Project (3GPP), Mobile Competence Centre; France, vol. RAN WG3, No. Prague, Czech Republic; Feb. 10, 2014-Feb. 14, 2014 Feb. 9, 2014; retrieved from the Internet on Feb. 9, 2014: URL: http://www.3gpp.org/ftp/Meetings_3GPP_SYNC/RAN/RAN3/Docs/.

Cewit: "Some Issues in Flow Control Design for Data Forwarding over X2 Interface", 3rd Generation Partnership Project (3GPP), Mobile Competence Centre; France, vol. RAN WG3, No. Dresden, Germany; Aug. 18, 2014-Aug. 22, 2014, Aug. 17, 2014; Retrieved from the Internet on Aug. 17, 2014: URL: http://www.3gpp.org/ftp/Meetings_3GPP_SYNC/RAN/RAN3/Docs/.

Kyocera Corp: "Support of inter-MeNB handover without SeNB change", 3rd Generation Partnership Project (3GPP), Mobile Competence Centre; France, vol. RAN WG3, No. Athens, Greece; Feb. 9, 2015-Feb. 13, 2015, Feb. 8, 2015; Retrieved from the Internet on Feb. 8, 2015: URL: http://www.3gpp.org/ftp/Meetings_3GPP_SYNC/RAN/RAN3/Docs/.

PCT International Search Report dated Jun. 29, 2015, Application No. PCT/CN2015/074644, 3 Pages.

Office Action dated Apr. 14, 2018 for Japanese Patent Application No. 2017-512304.

Broadcom Corporation: "MCG handover for Dual Connectivity", 3GPP Draft; R2-140531 MCG Handover for Dual Connectivity, 3rd Generation Partnership Project (3GPP), Mobile Competence Centre; 650, Route Des Lucioles; F-06921 Sophia-Antipolis Cedex; France, vol. RAN WG2, No. 83, Prague, Czech Republic; Feb. 10-14, 2014, Retrieved from Internet: URL: http://www.3gpp.org/ftp/tsg_ran/WG2_RL2/TSGR2_85/Docs.

ZTE Corporation:"Analysis on the SOlutions for the Prioritized Scenarios of MeNB Handover", 3GPP Draft; R3-140053 Znalysis on the Solutions for the Prioritized Scenarios of MeNB Handover, 3rd Generation Partnership Projection (3GPP), Mobile Competence Centre; 650, Route Des Lucioles; F-06921 Sophia-Antipolis Cedex; France, vol. RAN WG2, No. 83, Prague, Czech Republic; Feb. 10-14, 2014, Retrieved from Internet: URL: http://www.3gpp.org/ftp/tsg_ran/WG2_RL2/TSGR2_85/Docs.

* cited by examiner

METHOD FOR USER EQUIPMENT TO SWITCH BASE STATION, BASE STATION AND USER EQUIPMENT

CROSS-REFERENCE TO RELATED APPLICATIONS

This application is a U.S. national phase of PCT Application No. PCT/CN2015/074644 filed on Mar. 19, 2015, which claims priority to Chinese Patent Application No. 201410444560.6 filed on Sep. 2, 2014, the disclosures of which are incorporated in their entirety by reference herein.

TECHNICAL FIELD

The present disclosure relates to methods for switching an evolved node B (eNB) by a user equipment, eNBs and user equipments in a mobile communication system, and particularly in a mobile communication system deployed in a heterogeneous network.

BACKGROUND

It is believed according to the third generation partnership project (3GPP) that deployment of small cells and improvement in their abilities is one of the most interesting topics in the development of future communication networks. At present, one scene endorsed generally in the communication industry is that low power nodes are deployed within the coverage range or at the boundary of marco eNBs and compose collectively an access network in an evolved universal terrestrial radio access network (E-UTRAN) system, thereby providing joint data transmission services for user equipment (UE).

For such typical scene, reference is made to a system architecture shown in FIG. 1, herein an eNB which establishes an S1-MME interface with a mobility management entity (MME) in a core network (CN) and is regarded as a mobile anchor point by the CN is called a master eNB (MeNB); and an node which is connected with the MeNB through an X2 interface and provides extra radio resources for the UE is called a secondary eNB (SeNB). A wireless Uu interface is established between the UE and both the MeNB and the SeNB in order to transmit control plane signaling and user plane data, that is, the UE is in dual connectivity (DC). Since such system architecture enables two (or even more) eNBs to provide simultaneously the radio resources for one UE for communication services, data throughput of the network is improved greatly.

For user plane transmission and protocol stack form under such system architecture, reference is made to FIG. 2. Taking downlink data as an example, the transmission process is shown as in FIG. 2(a). A transmission operation of an EPS bearer #1 is the same as associated standards, that is, data packets are sent to the MeNB by a serving gateway (S-GW) through an S1-U interface, and then the MeNB sends the data packets to the UE through the Uu interface; and transmission of an EPS bearer #2 means that, after data packets are sent to the MeNB by the S-GW through an S1-U interface, only one part of the data packets of the bearer are sent to the UE by the MeNB through the Uu interface, and the other part of the data packets are delivered to the SeNB through an X2 interface and then are sent to the UE by the SeNB through the Uu interface.

A protocol stack form configurable by the EPS bearer #2 is shown in FIG. 2(b), i.e., the EPS bearer #2 has one packet data convergence protocol (PDCP) entity and two independent sets of radio link control (RLC) and lower level protocol entities. At a sending end of data, the PDCP entity located in the MeNB delivers one part of PDCP protocol data units (PDUs) to an RLC entity located in the SeNB for transmission, and the other part of the PDCP PDUs are sent by an RLC entity (and lower level protocol entities) of the MeNB itself. At a receiving end of the data, the two RLC entities process and then deliver the received RLC PDUs to the same PDCP entity to perform further operations, respectively.

Two scenes will exist in the process of data transmission and/or movement of the UE: one is, for example, that when variables in a certain protocol layer accumulate to a certain threshold, some configuration parameters of the UE are required to be modified; the other is, for example, that when signal quality decrease to a certain threshold, a serving eNB of the UE is required to be switched from the currently connected eNB (referred to as source eNB) to another appropriate eNB (referred to as target eNB). The two scenes need to be implemented through an intra-eNB change (the UE is connected with the same eNB both before and after the change, and only associated parameters are reconfigured) or inter-eNB change (the UE is connected with different eNBs before and after the change) procedure.

Under the system architecture described above, when the MeNB of the UE needs to be changed, according to the related techniques, the SeNB of the UE will be released before the change procedure or during the preparatory stage of the change procedure. If there are still nodes satisfying service requirements and appropriate conditions after the UE has access to the target eNB (for the intra-eNB change, the target eNB is the original MeNB), then the target eNB will add a SeNB to the UE. In an exemplary embodiment, for the intra-eNB change, if the condition of the original SeNB satisfies a threshold all the time, then both (intra-) change information of the MeNB and information on the release and re-adding of the SeNB may be carried by the MeNB in a piece of control plane signaling, i.e., only one piece of signaling is required to instruct the UE to reconfigure resources for the two eNB.

It can be seen that under the network related design ability, user plane data transmission between the UE and the SeNB will be interrupted because of the MeNB change for the UE. If the time it takes for the UE to have access to the target eNB cell is longer, then the time of the user plane data interruption between the UE and the SeNB will be lengthened accordingly. This means that radio resources that can be provided by the network for the UE are vacated, i.e., the data throughput of the UE which could have been increased is limited. Furthermore, overall performance of the network is decreased as well.

SUMMARY

Embodiments of the present disclosure provide methods for switching an eNB by a user equipment, eNBs and user equipments, so as to solve the problem of data interruption of a user plane between the UE and a secondary eNB which the UE accesses to when a master eNB which the UE accesses to is changed.

In order to solve the problem described above, an embodiment of the present disclosure discloses a method for switching an eNB by a UE, including: when a master eNB of the UE in dual connectivity is switched, a target eNB determining that the UE keeps a connection and configuration with a secondary eNB; and the target eNB establishing a connection with the UE while the UE keeps the connection and configuration with the secondary eNB.

In an exemplary embodiment, in the method described above, the target eNB determining that the UE keeps the connection and configuration with the secondary eNB includes: the target eNB receiving a switching request and secondary eNB information of the UE sent by the master eNB, judging whether the UE keeps the connection and configuration with the secondary eNB after switching the eNB according to the secondary eNB information of the UE, and determining that the UE keeps the connection and configuration with the secondary eNB if yes.

In an exemplary embodiment, in the method described above, the target eNB receiving the switching request and the secondary eNB information of the UE sent by the master eNB includes: the target eNB receiving a switching request message sent by the master eNB, herein the switching request message carries the secondary eNB information of the UE.

In an exemplary embodiment, the method described above further includes: if the target eNB determines that the UE keeps the connection and configuration with the secondary eNB after switching the eNB, then the target eNB first establishing an interface connection with the secondary eNB, and then feeding a switching request acknowledgment and indication information for allowing the UE to retain the connection and configuration with the secondary eNB back to the master eNB.

In an exemplary embodiment, in the method described above, the target eNB feeding the switching request acknowledgment and the indication information for allowing the UE to retain the connection and configuration with the secondary eNB back to the master eNB includes: the target eNB feeding a switching request acknowledgment message back to the master eNB, wherein the switching request acknowledgment message carries the indication information for allowing the UE to retain the connection and configuration with the secondary eNB.

In an exemplary embodiment, the method described above further includes: the target eNB establishing a connection with the UE, and performing data scheduling of a user plane for the UE after the UE has accessed to a target cell and enabled a new configuration, herein the target eNB performing the data scheduling of the user plane for the UE includes the target eNB sending data through a Uu interface between the target eNB itself and the UE and the target eNB sending part of PDCP PDUs to the UE though the secondary eNB.

In an exemplary embodiment, the method described above further includes: after receiving the indication information for allowing the UE to retain the connection and configuration with the secondary eNB sent by the target eNB, the master eNB continuing to deliver the originally configured data packets of a shunting bearer to the secondary eNB according to the indication for allowing the UE to retain the connection and configuration with the secondary eNB.

In an exemplary embodiment, the method described above further includes: when the master eNB continues to deliver the originally configured data packets of the shunting bearer to the secondary eNB, sending data packets to the target eNB; or, when the master eNB continues to deliver the originally configured data packets of the shunting bearer to the secondary eNB until information of the UE enabling a new configuration already is received, stopping sending data packets to the secondary eNB and beginning to send the data packets to the target eNB.

In an exemplary embodiment, the method described above further includes: the secondary eNB receiving the originally configured data packets of the shunting bearer from the master eNB, and then receiving the newly configured data packets of the shunting bearer from the target eNB; and the secondary eNB sending in order the received data packets to the UE, herein, when the secondary eNB receives newly configured data packets of the shunting bearer sent by the target eNB and there are still data packets which are not sent in a cache, the secondary eNB discards the data packets in the cache.

An embodiment of the present disclosure further discloses a method for switching an eNB by a UE, including: when a master eNB of the UE in dual connectivity is switched, the UE keeping a connection and configuration with a secondary eNB while establishing a connection with a target eNB.

In an exemplary embodiment, in the method described above, the UE keeping the connection and configuration with the secondary eNB while establishing the connection with the target eNB includes: the UE receiving a radio resource control (RRC) connection reconfiguration and an indication for keeping the connection and configuration with the secondary eNB sent by the master eNB; and the UE leaving a source primary cell and accessing to a target cell according to the RRC connection reconfiguration, while keeping the connection and configuration with the secondary eNB according to the indication for keeping the connection and configuration with the secondary eNB.

In an exemplary embodiment, in the method described above, the UE receiving the RRC connection reconfiguration and the indication for keeping the connection and configuration with the secondary eNB sent by the master eNB includes: the UE receiving an RRC connection reconfiguration message, herein the RRC connection reconfiguration message contains the indication for keeping the connection and configuration with the secondary eNB.

In an exemplary embodiment, the method described above further includes: after the UE accesses to the target cell, the UE feeding information of enabling a new configuration already back to the master eNB and/or the secondary eNB.

An embodiment of the present disclosure further discloses a method for switching an eNB by a UE, including: when a primary cell under a master eNB of the UE in dual connectivity is switched, the master eNB determining that the UE keeps a connection and configuration with a secondary eNB; and the master eNB instructing the UE to leave a source cell and access to a target cell while keeping the connection and configuration with the secondary eNB.

In an exemplary embodiment, in the method described above, the master eNB instructing the UE to leave the source cell and access to the target cell while keeping the connection and configuration with the secondary eNB includes: the master eNB sending an RRC connection reconfiguration and an indication for keeping the connection and configuration with the secondary eNB to the UE.

In an exemplary embodiment, in the method described above, the master eNB sending the RRC connection reconfiguration and the indication for keeping the connection and configuration with the secondary eNB to the UE includes: the master eNB sending an RRC connection reconfiguration message to the UE, herein the RRC connection reconfiguration message carries the indication for keeping the connection and configuration with the secondary eNB.

An embodiment of the present disclosure further discloses a method for switching an eNB by a UE, including: when a primary cell under a master eNB of the UE in dual connectivity is switched, the UE keeping a connection and configuration with a secondary eNB while leaving a source cell and accessing to a target cell.

In an exemplary embodiment, in the method described above, the UE keeping the connection and configuration with the secondary eNB while leaving the source cell and accessing to the target cell includes: the UE receiving an RRC connection reconfiguration and an indication for keeping the connection and configuration with the secondary eNB sent by the master eNB, and leaving the source cell and accessing to the target cell according to the RRC connection reconfiguration, while keeping the connection and configuration with the secondary eNB according to the indication for keeping the connection and configuration with the secondary eNB.

In an exemplary embodiment, in the method described above, the UE receiving the RRC connection reconfiguration and the indication for keeping the connection and configuration with the secondary eNB sent by the master eNB includes: the UE receiving an RRC connection reconfiguration message sent by the master eNB, herein the RRC connection reconfiguration message carries the indication for keeping the connection and configuration with the secondary eNB.

An embodiment of the present disclosure further discloses an eNB device including: a first unit arranged to determine that a UE keeps a connection and configuration with a secondary eNB when a master eNB of the UE in dual connectivity is switched to the eNB device; and a second unit arranged to establish a connection with the UE while the UE keeps the connection and configuration with the secondary eNB.

In an exemplary embodiment, in the eNB device described above, the first unit includes: a receiving module arranged to receive a switching request and secondary eNB information of the UE sent by the master eNB; and a judgment module arranged to judge whether the UE keeps the connection and configuration with the secondary eNB after switching the eNB according to the secondary eNB information of the UE, and if yes, determine that the UE keeps the connection and configuration with the secondary eNB when the master eNB of the UE in dual connectivity is switched to the eNB device.

In an exemplary embodiment, in the eNB device described above, the receiving module receiving the switching request and the secondary eNB information of the UE sent by the master eNB includes: receiving a switching request message sent by the master eNB, wherein the switching request message carries the secondary eNB information of the UE.

In an exemplary embodiment, in the eNB device described above, the first unit further includes: an inter-eNB link establishment module arranged to, when the judgment module determines that the UE keeps the connection and configuration with the secondary eNB, first establish an interface connection with the secondary eNB, and then feed a switching request acknowledgment and indication information for allowing the UE to retain the connection and configuration with the secondary eNB back to the master eNB.

In an exemplary embodiment, in the eNB device described above, the inter-eNB link establishment module feeding the switching request acknowledgment and the indication information for allowing the UE to retain the connection and configuration with the secondary eNB back to the master eNB includes: feeding a switching request acknowledgment message back to the master eNB, herein the switching request acknowledgment message carries the indication information for allowing the UE to retain the connection and configuration with the secondary eNB.

In an exemplary embodiment, in the eNB device described above, the second unit is further arranged to establish a connection with the UE, and perform data scheduling of a user plane for the UE after the UE has accessed to a target cell and enabled a new configuration, herein the second unit performing the data scheduling of the user plane for the UE comprises: sending data through a Uu interface between the device and the UE, and sending part of PDCP PDUs to the UE though the secondary eNB.

In an exemplary embodiment, the eNB device described above further includes: a third unit arranged to, when the eNB device is the master eNB of the UE in dual connectivity and is switched to a target eNB, receive the indication information for allowing the UE to retain the connection and configuration with the secondary eNB sent by the target eNB, and continue to deliver originally configured data packets of a shunting bearer to the secondary eNB according to the indication for allowing the UE to retain the connection and configuration with the secondary eNB.

In an exemplary embodiment, in the eNB device described above, the third unit is further arranged to, when continuing to deliver the originally configured data packets of the shunting bearer to the secondary eNB, send data packets to the target eNB; or, when continuing to deliver the originally configured data packets of the shunting bearer to the secondary eNB until information of the UE enabling a new configuration already is received, first stop sending data packets to the secondary eNB and then send the data packets to the target eNB.

In an exemplary embodiment, the eNB device described above further includes: a fourth unit arranged to, when the eNB device is the secondary eNB of the UE in dual connectivity, receive the originally configured data packets of the shunting bearer from the master eNB, and then receive newly configured data packets of the shunting bearer from the target eNB, and send in order the received data packets to the UE, herein, when the newly configured data packets of the shunting bearer sent by the target eNB are received, if there are still data packets which are not sent in a cache, then the data packets in the cache are discarded.

An embodiment of the present disclosure further discloses a user equipment including: a first unit arranged to keep a connection and configuration with a secondary eNB in dual connectivity when a master eNB of the user equipment is switched; and a second unit arranged to establish a connection with a switched target eNB while the first unit keeps the connection and configuration with the secondary eNB.

In an exemplary embodiment, the user equipment described above further includes: a receiving and transmitting unit arranged to receive an RRC connection reconfiguration and an indication for keeping the connection and configuration with the secondary eNB sent by the master eNB; herein, the first unit is arranged to, when the master eNB of the user equipment is switched, keep the connection and configuration with the secondary eNB in dual connectivity according to the indication for keeping the connection and configuration with the secondary eNB; and the second unit is arranged to leave a source cell and access to a target cell according to the RRC connection reconfiguration while the first unit keeps the connection and configuration with the secondary eNB.

In an exemplary embodiment, in the user equipment described above, the receiving and transmitting unit receiving the RRC connection reconfiguration and the indication for keeping the connection and configuration with the secondary eNB sent by the master eNB includes: the receiving and transmitting unit receiving an RRC connection reconfiguration message, herein the RRC connection reconfiguration message carries the indication for keeping the connection and configuration with the secondary eNB.

In an exemplary embodiment, in the user equipment described above, the receiving and transmitting unit is further arranged to, after the user equipment accesses to the target cell, feed information of enabling a new configuration already back to the master eNB and/or the secondary eNB.

An embodiment of the present disclosure further discloses an eNB device including: a first unit arranged to determine that a user equipment, UE, keeps a connection and configuration with a secondary eNB when a primary cell under the eNB device of the UE in dual connectivity is switched; and a second unit arranged to, when the first unit determines that the UE keeps the connection and configuration with the secondary eNB, instruct the UE to leave a source cell and access to a target cell while keeping the connection and configuration with the secondary eNB.

In an exemplary embodiment, in the eNB device described above, the second unit instructing the UE to leave the source cell and access to the target cell while keeping the connection and configuration with the secondary eNB includes: the second unit arranged to send an RRC connection reconfiguration and an indication for keeping the connection and configuration with the secondary eNB to the UE.

In an exemplary embodiment, in the eNB device described above, the second unit is arranged to send an RRC connection reconfiguration message to the UE, herein the RRC connection reconfiguration message carries the indication for keeping the connection and configuration with the secondary eNB.

An embodiment of the present disclosure further discloses a user equipment including: a first unit arranged to keep a connection and configuration with a secondary eNB when a primary cell under a master eNB of the user equipment is switched; and a second unit arranged to leave a source cell and access to a target cell while the first unit keeps the connection and configuration with the secondary eNB.

In an exemplary embodiment, the user equipment described above further includes: a receiving unit arranged to receive an RRC connection reconfiguration and an indication for keeping the connection and configuration with the secondary eNB sent by the master eNB; herein, the first unit is arranged to keep the connection and configuration with the secondary eNB according to the indication for keeping the connection and configuration with the secondary eNB; and the second unit is arranged to leave the source cell and access to the target cell according to the RRC connection reconfiguration message while the first unit keeps the connection and configuration with the secondary eNB.

In an exemplary embodiment, in the user equipment described above, the receiving unit arranged to receive the RRC connection reconfiguration and the indication for keeping the connection and configuration with the secondary eNB sent by the master eNB includes: the receiving unit arranged to receive an RRC connection reconfiguration message sent by the master eNB, herein the RRC connection reconfiguration message carries the indication for keeping the connection and configuration with the secondary eNB.

An embodiment of the presen disclosure further disclose a computer storage medium storing computer executable instructions therein which are used for executing the methods described above.

Solutions for improving data transmission performance of the user equipment in the heterogeneous network provided by the technical schemes of the present application are applicable to all types of eNBs and all types of interfaces with various performances between the eNBs. Using the technical schemes of the present application, in the process of data transmission and/or movement of the UE, when the master eNB which the UE accesses to is changed, the user plane between the UE and the secondary eNB which the UE accesses to will not be interrupted, i.e., the data can be transmitted sequentially. Therefore, the performance and throughput of the UE transmitting data are increased and the utilization efficiency of radio resources is improved.

DETAILED DESCRIPTION

The technical scheme of embodiments of the present disclosure will be described in further detail in conjunction with the accompanying drawings. It is should be noted that the embodiments of the present application and features in the embodiments can be combined with each other arbitrarily without conflicts.

Embodiment 1

Figure 1:
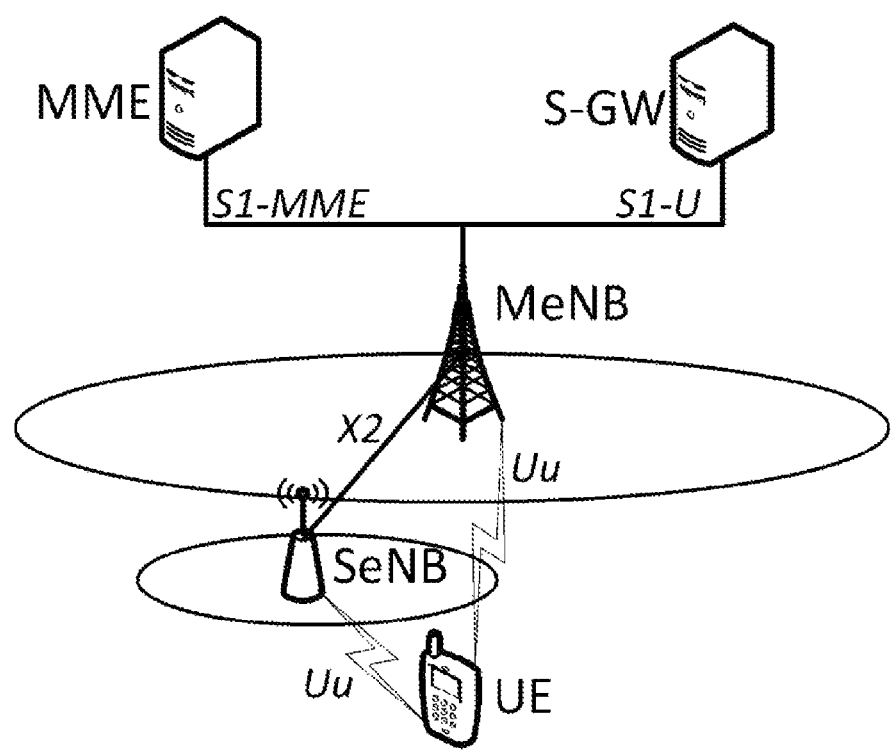
FIG. 1 is a schematic diagram of a deployment of a related heterogeneous network.
Figure 2A:
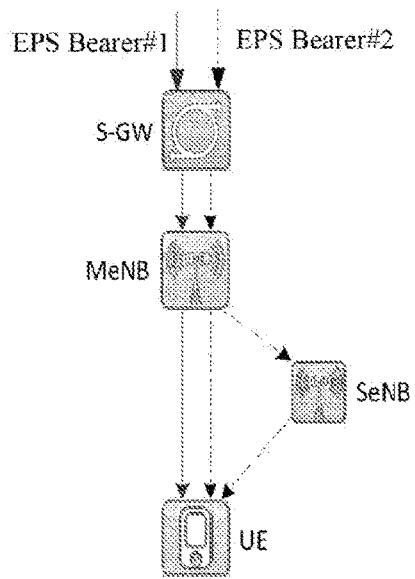
FIG. 2(a) is a schematic diagram of downlink data transmission in the heterogeneous network as shown in FIG. 1.
Figure 2B:
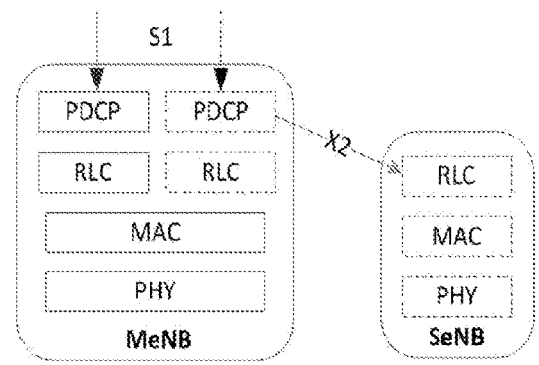
FIG. 2(b) is a schematic diagram of protocol stack configurable by a shunting bearer in the heterogeneous network as shown in FIG. 1.
Figure 3:
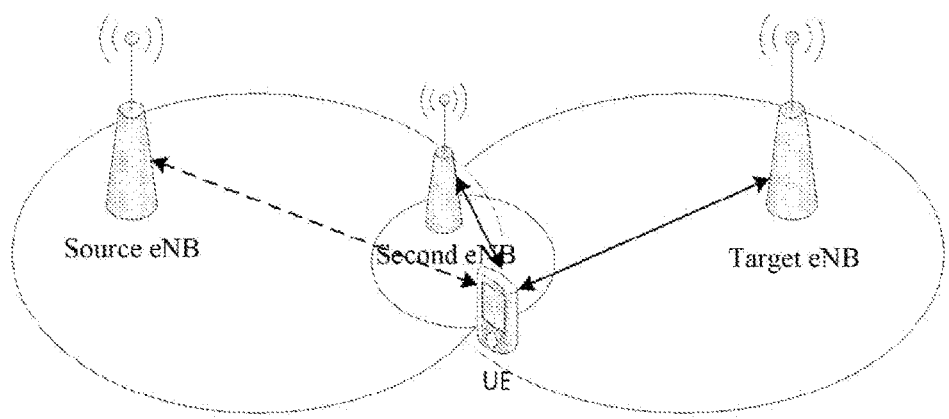
FIG. 3 is a schematic diagram of a scene appliable to a scheme of an embodiment of the present disclosure.

In the disclosure, in the process of movement of a UE, a master eNB may be required to be changed. For example, as shown in FIG. 3, signal quality between the UE and a serving cell (referred to as source cell) of a first eNB (which is referred to as source eNB in a mobile scene) is decreased and signal quality between the UE and a cell (referred to as target cell) of a third eNB (referred to as target eNB) is increased; meanwhile, the UE is within the coverage range of a second eNB all the time, i.e., signal quality between the UE and the second eNB keeps good. In such a case, after requesting an agreement of the target eNB, the source eNB instructs the UE to leave the source cell and access to the target cell, and needs to instruct the UE to transmit data with the second eNB sequentially after the UE accesses to the target cell (i.e., to keep a DC state), in order to keep the data transmission between the UE and the second eNB. Thus, the target eNB becomes a new master eNB of the UE, establishes an X2 interface with the second eNB and is responsible for transmitting control plane signaling and user plane data with each node of a core network.

Based on the idea described above, the present embodiment provides a method for switching eNBs by user equipment, which is described mainly in terms of operations at the network side and includes the following operations: when a master eNB of the UE in dual connectivity is switched, a target eNB determining that the UE keeps a connection and configuration with a secondary eNB; and the target eNB establishing a connection with the UE when the UE keeps the connection and configuration with the secondary eNB.

Herein, in an exemplary embodiment, the target eNB determining that the UE keeps the connection and configuration with the secondary eNB includes: the target eNB receiving a switching request (which may be a resource request message) and secondary eNB information of the UE sent by the master eNB, judging whether the UE keeps the connection and configuration with the secondary eNB after the switching of the eNB according to the secondary eNB information of the UE, i.e., judging whether a cell which the UE has access to at the secondary eNB and the configuration will be retained for the UE after the UE is admitted, and determining that the UE keeps the connection and configuration with the secondary eNB if yes. Herein, the secondary eNB information of the UE includes information of the secondary eNB cell which the UE has access to, signal quality measurement results of the secondary eNB cell by the UE and resource configuration information of the UE at the secondary eNB side. In an exemplary embodiment, in the embodiment, the secondary eNB information of the UE received by the target eNB may be included in a switching request message sent by the master eNB or may be included in a existing eNB configuration updating message, a newly-added message or a newly-added private message or the like, sent by the master eNB.

After performing the operations according to the procedure described above, if the target eNB determines that the UE is allowed to keep the connection and configuration with the secondary eNB after the switching of the eNB, then the target eNB first establishes an interface connection with the secondary eNB, i.e., initiates, to the secondary eNB, a procedure of adding an auxiliary eNB, the main purpose of which is to establish a cooperation interface that can provide the dual connectivity service for the UE, including control plane and user plane tunnels. Then, the target eNB replies to the master eNB with a switching request acknowledgment and indication information for allowing the UE to retain the connection and configuration with the secondary eNB. In addition, the indication information for allowing the UE to retain the connection and configuration with the secondary eNB may be contained in a switching request acknowledgement message (which may also be called admission acknowledgement message) or may be contained in a existing eNB configuration updating message, a newly-added message or a newly-added private message.

In addition, when the switching request acknowledgement (which may also be called admission acknowledgement) message and the indication information for allowing the UE to retain the connection and configuration with the secondary eNB, fed back by the target eNB, are received, the master eNB instructs the UE to leave the source cell and access to the target cell according to the switching request acknowledgement message, instructs the UE to keep the connection and configuration with the secondary eNB during the switching according to the indication information for allowing the UE to retain the connection and configuration with the secondary eNB, and composes the UE-oriented control plane signaling according to new resource configuration information in the switching request acknowledgement (i.e., admission acknowledgement) message and forward it to the UE.

On the basis of the method described above, the target eNB, as the master eNB of the UE, may perform data scheduling of the user plane for the UE after the UE has had access to the target cell and enabled a new configuration, herein sending an EPS bearer includes the target eNB sending the EPS bearer through a Uu interface between the target eNB itself and the UE and the target eNB delivering part of PDCP PDUs to the secondary eNB for transmission.

In an exemplary embodiment, if the target eNB is arranged to feed back a PDCP status report after the UE accesses successfully, then the target eNB will perform retransmission or discarding operation of data packets only after the PDCP status report is received.

It should be further noted that, when the master eNB composes the UE-oriented control plane signaling according to the received information and sends it to the UE. Sending data packets of a user plane between the eNBs includes mainly the master eNB sending the data packets to the secondary eNB and forwarding the data packets to the target eNB.

The data packets sent by the master eNB to the secondary eNB include: PDCP PDUs indicated to be transmitted successfully by an RLC entity of its own, which have not been received yet when the master eNB sends the control plane signaling to the UE; PDCP PDUs which have not been transmitted yet in a PDCP entity cache of the master eNB; and PDCP PDUs which are subsequently received newly from an S-GW and processed by a PDCP entity. The sending behavior terminates when the source eNB has received information of the UE enabling a new configuration already.

The data packets forwarded by the master eNB to the target eNB include: PDCP SDUs indicated to be transmitted successfully by an RLC entity (including an RLC entity located in the master eNB or the secondary eNB), which have not been received yet when the master eNB sends the control plane signaling to the UE; SDUs which have not been transmitted yet in a PDCP entity cache of the master eNB; and PDCP SDUs which are subsequently received newly from an S-GW. The forwarding behavior begins after the master eNB sends the control plane signaling for eNB change to the UE or begins when the master eNB has received information of the UE enabling the new configuration already; the forwarding behavior terminates when the master eNB has forwarded all the data packets of the UE.

In the procedure described above, the secondary eNB will first receive PDCP PDUs from the master eNB and then receive PDCP PDUs from the target eNB, and the secondary eNB will process these data packets via a lower level protocol entity and then send them to the UE in order. If when the secondary eNB receives the PDCP PDUs from the target eNB, there are still data packets in a RLC entity cache which are not sent, then the secondary eNB will discard these data packets and will not send these data packets any more.

The target eNB or the UE may indicate, to the secondary eNB through an X2 interface or a Uu interface, the information of the UE enabling the new configuration already. After the secondary eNB receives this information, its RLC entity cache will discard all of the data packets from the master eNB and will not send the data packets any more.

In an exemplary embodiment, after acquiring the information of the UE enabling the new configuration already, the master eNB may send a piece of information of a termination flag to the secondary eNB to indicate that the secondary eNB do not need to send the data packets to the UE anymore. The indication information of the termination flag may be a designator of a control plane or user plane or may be a control plane message of asking the secondary eNB to release a transmission tunnel between the master eNB and the secondary eNB.

For the protocol entity portion (including PDCP entity) corresponding to the secondary eNB in the EPS bearer, the UE will not enable immediately the new configuration when receiving the eNB change signaling from the master eNB, but will use the original configuration to continue to work; after having access to the target cell and returning the signaling indicating that the new configuration have been enabled, the PDCP entity of the UE will begin to enable the new configuration. However, the configuration of the lower level entity keeps unchanged, and the data packets decrypted unsuccessfully or duplicated are discarded.

It should be noted that in the specific embodiments downlink data transmission is taken as an example, and for uplink data transmission (if there are uplink bearers which are transmitted via the second eNB), the UE will transmit its born uplink data according to uplink transmission resources allocated by the second eNB after receiving air interface control plane signaling and during the enabling of the new configuration; and the secondary eNB delivers the received uplink data to the master eNB. After acquiring the information of the UE enabling the new configuration already, the secondary eNB will deliver the received uplink data to the target eNB.

The present embodiment further provides another method for switching eNBs by user equipment, which is described mainly in terms of operations at the user side and includes: when a master eNB of the UE in dual connectivity is switched, the UE keeps a connection and configuration with a secondary eNB while establishing a connection with the switched target eNB.

Herein, the UE keeping the connection and configuration with the secondary eNB while establishing the connection with the target eNB includes: the UE receiving an RRC message and an indication for keeping the connection and configuration with the secondary eNB sent by the master eNB; and the UE leaving a source cell and having access to a target cell according to the RRC message while keeping the connection and configuration with the secondary eNB according to the indication for keeping the connection and configuration with the secondary eNB.

In the present embodiment, the indication for keeping the connection and configuration with the secondary eNB received by the UE may be contained in an RRC connection reconfiguration message or may be contained in a newly-added private message, and is not limited thereto.

In addition, considering resource utilization of the secondary eNB and master eNB, the information of enabling the new configuration already may be fed back to the master eNB and/or the secondary eNB after the UE has access to the target cell. Thus, after receiving the information indicating that the new configuration is enabled already, the master eNB can send a termination indication to the secondary eNB to instruct the secondary eNB to discard all of the cached data packets of the master eNB to improve the resource utilization of the secondary eNB. Likewise, after receiving the information indicating that the new configuration is enabled already, the secondary eNB can discard directly all of the data packets cached in the local master eNB, and the resource utilization is improved as well.

The entire procedure of the switching of the eNB (including a preparatory phase of an inter-eNB change procedure, an execution phase of the inter-eNB change procedure and a completion phase of the inter-eNB change procedure) will be described in detail in conjunction with different application scenes. Herein, the complete eNB switching procedure includes the operations at the network side and the user side described above.

Figure 4:
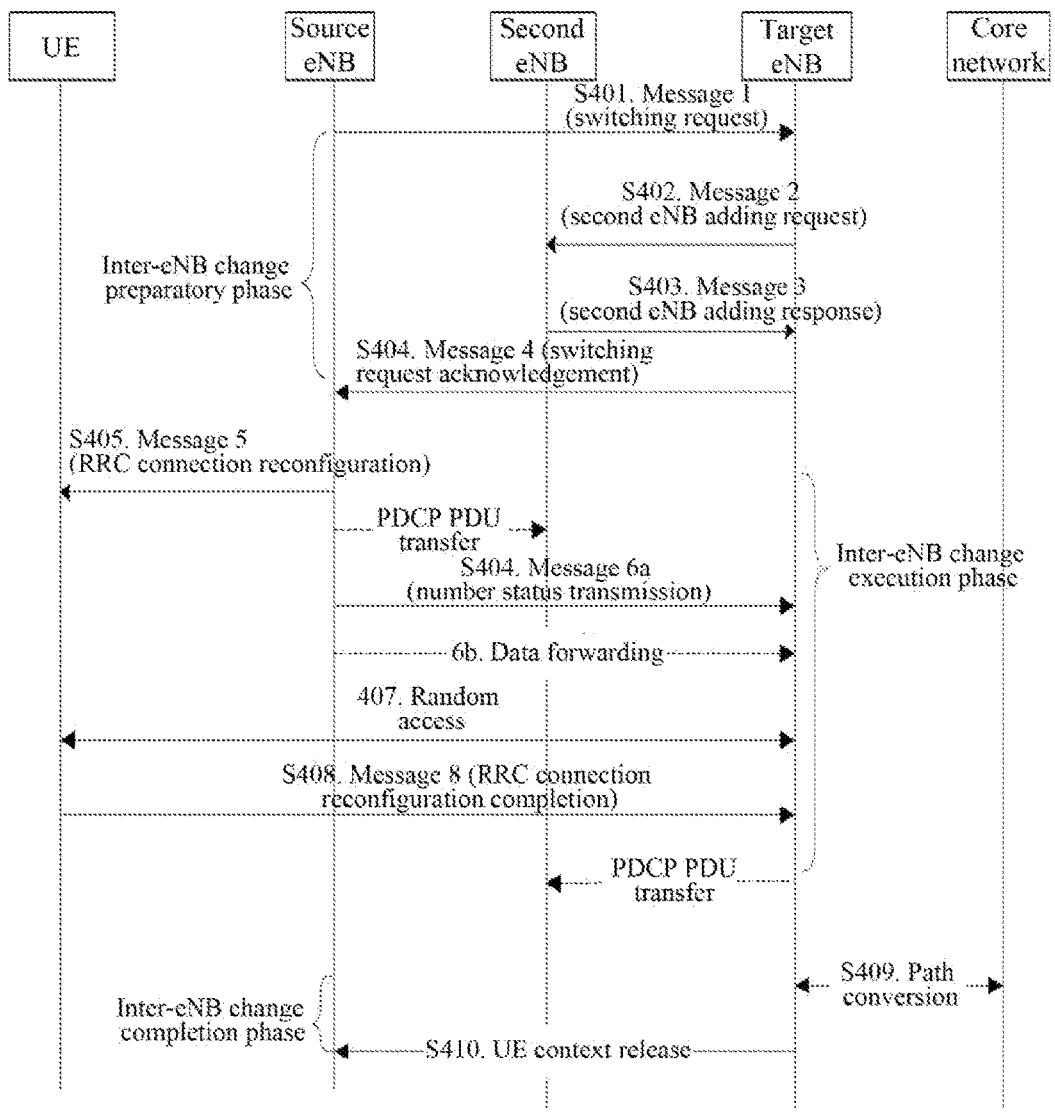
FIG. 4 is a flow chart of an embodiment one of the present disclosure.

Application Scene 1:

Under the system architecture described above, the target eNB determines that the UE can still continue to perform data transmission with the second eNB after having access to the target cell, i.e., keep the DC state. After receiving the message from the target eNB, the source eNB continue to deliver the PDCP PDUs of the EPS bearer to the second eNB such that the UE can still continue to perform data transmission of the user plane with the second eNB during the inter-eNB change procedure of the first eNB. The UE begins to enable the new configuration after having access to the target cell. The specific procedure is as shown in FIG4.

A data transmission path of the user plane of the UE before the first eNB (i.e., the master eNB, which is also called source eNB in this scene) performs the change procedure (as described above, taking downlink EPS Bearer#2 configured as a shunting mode as an example): the source eNB receives EPS Bearer#2 data packets from a S-GW, and a PDCP entity located in the source eNB performs an packaging operation such as encryption on the data packets. According to the set shunting strategy, the PDCP entity sends one part of the PDCP PDUs to the UE through a Uu interface between the source eNB and the UE and sends the other part of the PDCO PDUs to the second eNB through an X2 interface between the source eNB and the second eNB (i.e., the secondary eNB). The second eNB processes the received PDCP PDUs via a lower level protocol entity and then sends them to the UE through the Uu interface.

The preparatory phase of the inter-eNB change procedure of the first eNB (steps 401~404): the source eNB decides to change the primary serving eNB of the UE to the target eNB according to a measurement report (or other results of radio resource management functions) of the UE to continue to obtain communication services. In addition to information such as resource configuration of the UE at the source eNB side, at least the secondary eNB information of the UE, such as measurement results of signals in the second eNB cell of the UE and resource configuration information at the second eNB side, is also carried in a message 1 (switching request message) sent by the source eNB to the target eNB.

Herein, when the source eNB sends the message 1, that is, when the master eNB of the UE is switched in the method described above, it can be believed that the switching procedure is entered.

The target eNB makes a determination according to the received information. If the target eNB decides to retain the connection with the second eNB for the UE and the related configuration is unchanged, then the target eNB requests to the second eNB for establishing a user plane tunnel which can transmit shunted data packets (PDCP PDUs). (The messages 2 and 3 in FIG. 4 are examples, and the main purpose of the X2 control plane signaling interacted between the target eNB and the second eNB is to establish a necessary interface in order to provide the DC service for the UE subsequently.)

After agreeing to a switching request of the source eNB and getting ready for interfacing with the second eNB, the target eNB replies to the source eNB with a message 4

(switching request acknowledgment message) carrying new resource configuration information and the indication for allowing the UE to continue to retain the connection with the second eNB.

The execution phase of the inter-eNB change procedure of the first eNB (steps 405~408): after receiving the acknowledgement replied by the target eNB, the source eNB sends a message 5 (RRC connection reconfiguration message, i.e., radio resource control connection reconfiguration message) to the UE to instruct the UE to leave the source cell and access to the target cell while keeping the connection and configuration with the second eNB. New configuration information indicated by the target eNB is carried in the message.

According to the indication of the message 5, the UE, on the one hand, leaves the source cell and has access to the target cell of the target eNB through a random access procedure, and on the other hand, the UE still uses the old configuration for each related protocol entity corresponding to the second eNB and shunting bearer (EPS Bearer#2), and continues to work. That is, when performing the inter-eNB change procedure of the first eNB, the UE can still continue to transmit data packets with the second eNB, and process the data packets via the PDCP entity to deliver to the upper layer.

After the source eNB sends the message 5 to the UE, the source eNB continues to deliver the data packets of the shunting bearer (EPS Bearer#2) to the second eNB for transmission. The data packets include: PDCP PDUs indicated to be transmitted successfully by an RLC entity of its own, which have not been received yet when the master eNB sends the message 5; PDCP PDUs which have not been transmitted yet in a PDCP entity cache of the source eNB; and PDCP PDUs which are subsequently received newly from an S-GW and processed by a PDCP entity. The second eNB processes the received data packets via a lower level protocol entity and then sends them to the UE through the Uu interface.

On the other hand, the source eNB sends a message 6a (number status message) to the target eNB and forwards data packets. The data packets include: PDCP SDUs indicated to be transmitted successfully by an RLC entity (including RLC entities located in the source eNB and the second eNB), which have not been received yet when the source eNB sends the message 5; SDU which has not been transmitted yet in a PDCP entity cache of the source eNB; and PDCP SDUs which are subsequently received newly from an S-GW. Thus, it can be ensured that, after the UE has access to the target cell, the target eNB stores data packets and can sent them to the UE immediately, thereby decreasing waiting time of the UE at the user plane.

After having access to the target cell successfully (step 407), the UE sends a message 8 (RRC connection reconfiguration complete message, i.e., radio resource control connection reconfiguration complete message) to the target eNB to indicate that the UE has enabled the new configuration. After receiving the message 8, the target eNB can perform transmission scheduling of the user plane for the UE. Herein, the sending of the shunting bearer includes the target eNB sending the EPS bearer through the Uu interface between the target eNB itself and the UE and the target eNB delivering part of the PDCP PDUs to the second eNB for sending. In an exemplary embodiment, if the target eNB is arranged to feed back a PDCP status report after the UE accesses successfully, then the target eNB will perform retransmission or discarding operation of data packets according to the information only after the status report is received.

Through the inter-eNB change procedure of the first eNB, the second eNB will first receive the originally configured PDCP PDUs from the source eNB and then receive the newly configured PDCP PDUs from the target eNB, and the second eNB will send these data packets to the UE in order. If when the second eNB receives the PDCP PDUs from the target eNB, there are still data packets in a RLC entity cache which are not sent, then the second eNB will discard these data packets and will not send these data packets any more. In an exemplary embodiment, the target eNB or the UE may indicate (according to the message 8), to the second eNB through an X2 interface or a Uu interface, the information of the UE enabling the new configuration already. After the second eNB receives this information, its RLC entity cache will discard all of the data packets from the source eNB and will not send the data packets any more.

The completion phase of the inter-eNB change procedure of the first eNB (steps 409~410): the target eNB requests the change of a downlink tunnel end point of the user plane from a CN node (MME) through a triggering procedure 9, and informs the user plane of information of an uplink tunnel end point. After receiving the request message, the CN will begin to send downlink data packets to the target eNB. The target eNB first transmits/retransmits data packets forwarded from the source eNB and then transmits data packets from the CN (S-GW). On the control plane, after receiving an acknowledgement message returned by the CN, the target eNB will send a message 10 (UE context release message) to the source eNB to indicate the successful completion of the inter-eNB change procedure, and the source eNB can delete the context of the UE after forwarding the data packets.

Figure 5:
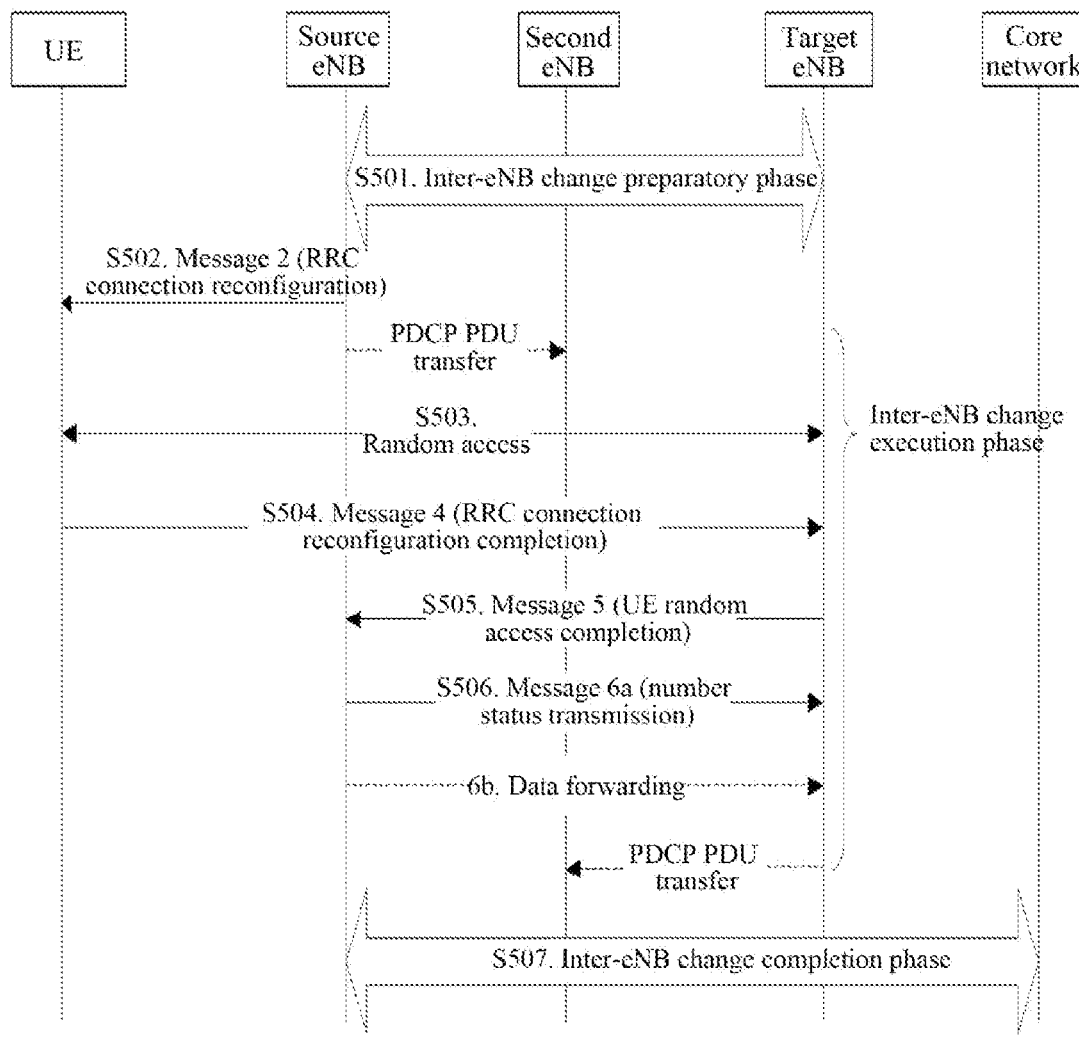
FIG. 5 is a flow chart of an embodiment two of the present disclosure.

Application Scene 2:

The system architecture which this scene is based on, a user plane mode and a mobile scene are the same as the scene 1. When the UE performs the execution phase of the inter-eNB change procedure of the first eNB, the source eNB continue to deliver the PDCP PDUs of the shunting bearer to the second eNB; and after acquiring the information of the UE accessing to the target cell successfully, the source eNB will begin to forward data packets to the target eNB. The UE begins to enable the new configuration after having access to the target cell. The specific procedure is as shown in FIG5.

A data transmission path of the user plane of the UE before the first eNB performs the change procedure and a preparatory phase (step 501) of the inter-eNB change procedure of the first eNB is the same as that described in the application scene 1.

A execution phase of the inter-eNB change procedure of the first eNB (steps 502~506): after receiving the acknowledgement replied by the target eNB, the source eNB sends a message 2 (RRC connection reconfiguration message) to the UE to instruct the UE to leave the source cell and access to the target cell while keeping the connection and configuration with the second eNB. New configuration information indicated by the target eNB is carried in the message.

According to the indication of the message 2, the UE, on the one hand, leaves the source cell and has access to the target cell of the target eNB through a random access procedure, and on the other hand, the UE still uses the old configuration for each related protocol entity corresponding to the second eNB and the shunting bearer (EPS Bearer#2), and continues to work.

After the source eNB sends the message 2 to the UE, the source eNB continues to deliver data packets of the shunting bearer (EPS Bearer#2) to the second eNB for transmission. The data packets include: PDCP PDUs indicated to be transmitted successfully by an RLC entity of its own, which have not been received yet when the source eNB sends the message 2; PDCP PDUs which have not been transmitted yet in a PDCP entity cache of the source eNB; and PDCP PDUs which are subsequently received newly from an S-GW and processed by a PDCP entity. The second eNB processes the received data packets via a lower level protocol entity and then sends them to the UE through a Uu interface. The source eNB will not forward the data packets to the target eNB at this time.

After having access to the target cell successfully (step 503), the UE sends a message 4 (RRC connection reconfiguration complete message) to the target eNB to indicate that the UE has enabled the new configuration. After receiving the message 4, the target eNB sends control plane signaling (message 5) to the source eNB to indicate that the UE has completed the change procedure of the first eNB successfully and begins to enable the new configuration. In an exemplary embodiment, if the second eNB can obtain information of the UE enabling the new configuration already through the lower level protocol entity, then the second eNB can send the information to the source eNB through an X2 interface.

After receiving the message 5, the source eNB stops delivering the data packets to the second eNB, begins to forward data to the target eNB through a data forwarding tunnel established in the preparatory phase in the change procedure, and sends a message 6a (number status message) to the target eNB. The forwarded data packets include: PDCP SDUs indicated to be transmitted successfully by an RLC entity located in the second eNB, which have not been received yet when the source eNB sends the message 5; SDUs which have not been transmitted yet in a PDCP entity cache of the source eNB; and PDCP SDUs which are subsequently received newly from an S-GW. Thus, redundancy of the data packets transmitted through the X2 interface may be decreased.

The target eNB may perform downlink transmission scheduling of the user plane for the UE after receiving the data packets. Herein, the sending of the shunting bearer includes the target eNB sending the EPS bearer through a Uu interface between the target eNB itself and the UE and the target eNB delivering part of PDCP PDUs to the second eNB for sending. In an exemplary embodiment, if the target eNB is arranged to feed back a PDCP status report after the UE accesses successfully, then the target eNB will perform retransmission or discarding operation of data packets according to feedback information of the status report.

Through the inter-eNB change procedure of the first eNB, the second eNB will first receive the originally configured PDCP PDUs from the source eNB and then receive the newly configured PDCP PDUs from the target eNB, and the second eNB will send these data packets to the UE in order. If when the second eNB receives the PDCP PDUs from the target eNB, there are still data packets in a RLC entity cache which are not sent, then the second eNB will discard these data packets and will not send these data packets any more. In an exemplary embodiment, the target eNB or the UE may indicate (according to the message 4), to the second eNB through an X2 interface or a Uu interface, the information of the UE enabling the new configuration already. After the second eNB receives this information, its RLC entity cache will discard all of the data packets from the source eNB and will not send the data packets any more. Or, in an exemplary embodiment, after acquiring the information of the UE enabling the new configuration already, the source eNB may send information of a termination flag to the second eNB to indicate that the second eNB do not need to send the data packets to the UE anymore. The indication information of the termination flag may be a designator of the control plane or user plane or may be a control plane message of asking the second eNB to release a transmission tunnel between the source eNB and the second eNB.

A completion phase of the inter-eNB change procedure of the first eNB (steps 507): is the same as the application scene 1.

Embodiment 2

The present embodiment provides a method for switching eNBs by user equipment, the idea of which is the same as the embodiment 1. This method is proposed for the case in which a primary cell in a master eNB of the UE is changed, is described in terms of operations at the master eNB side and mainly includes the following operations: when a primary cell under a master eNB of the UE in dual connectivity is switched, the master eNB determining that the UE keeps a connection and configuration with a secondary eNB; and the master eNB instructing the UE to leave a source cell and access to a target cell while keeping the connection and configuration with the secondary eNB.

Herein, the master eNB sending an RRC and an indication for keeping the connection and configuration with the secondary eNB to the UE means that the master eNB instructs the UE to leave the source cell and access to the target cell while keeping the connection and configuration with the secondary eNB. In an exemplary embodiment, the indication for keeping the connection and configuration with the secondary eNB may be contained in an RRC connection reconfiguration message. In other embodiments, the indication for keeping the connection and configuration with the secondary eNB may be contained in a newly-added message as well, and is not specially limited thereto herein.

When the UE has had access to the target cell and enabled a new configuration, the master eNB may use new resource configuration information to transmit data for the UE.

The present embodiment further provides a method for switching eNBs by user equipment, which is corresponding to the method described above, is described mainly in terms of operations at the UE side and includes the following operations: when a primary cell under a master eNB of the UE in dual connectivity is switched, the UE keeping a connection and configuration with a secondary eNB while leaving a source cell and having access to a target cell.

In an exemplary embodiment, the UE receives an RRC connection reconfiguration and an indication for keeping the connection and configuration with the secondary eNB sent by the master eNB, and then leaves the source cell and has access to the target cell according to the RRC while keeping the connection and configuration with the secondary eNB according to the indication for keeping the connection and configuration with the secondary eNB. Herein, the indication for keeping the connection and configuration with the secondary eNB may be contained in an RRC connection reconfiguration message sent by the master eNB. Certainly, the indication for keeping the connection and configuration with the secondary eNB may be contained in a newly-added message as well, and is not limited thereto in this embodiment.

The process of implementing the switching of the eNBs according the methods described above will be described below in conjunction with a specific application scene.

Herein, the complete eNB switching procedure contains operations at the eNBs and UE sides in the methods described above.

Figure 6:
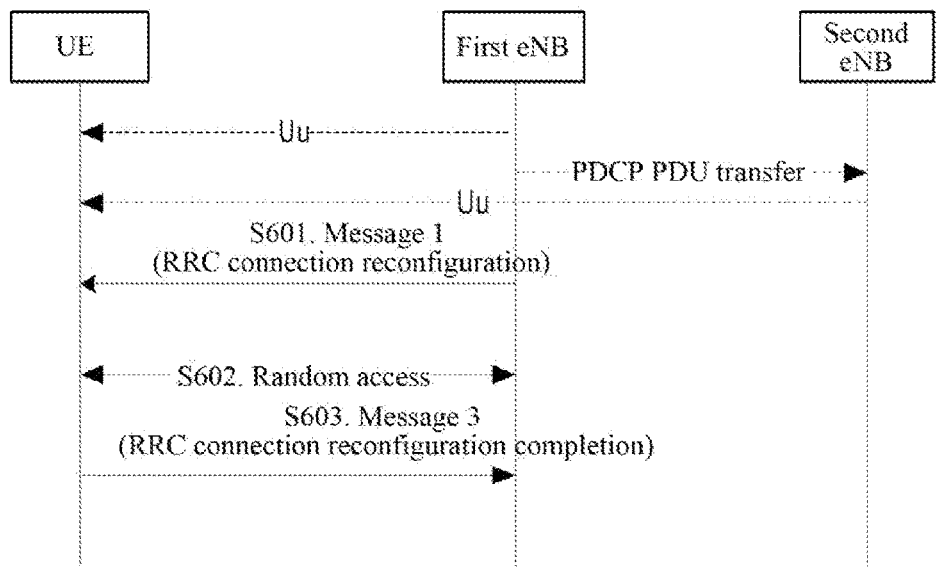
FIG. 6 is a schematic diagram of messages of an embodiment three of the present disclosure.

The system architecture which this present application scene is based on and a user plane mode are the same as the application scene 1 in the embodiment 1. In the process of movement of the UE, a serving cell which is accessed by the UE under the first eNB (i.e., master eNB) is changed (if the UE configures carrier aggregation at the first eNB, then the scene which the embodiment is based on is that a primary cell at the first eNB of the UE will be changed), thus, the first eNB decides to reconfigure mobility of the UE, which is referred to as a case of intra-eNB change in the present patent. When the UE performs an execution phase of the intra-eNB change procedure of the first eNB, the first eNB still continues to deliver PDCP PDUs of the shunting bearer to the second eNB. The UE begins to enable a new configuration after re-accessing to the cell of the first eNB. The specific procedure is as shown in FIG. 6.

A data transmission path of the user plane of the UE before the first eNB performs the intra-eNB change procedure is the same as that described in the application scene 1.

At step 601: the first eNB decides to need to change the (primary) serving cell (source cell) of the UE to other cell (target cell) in the first eNB while keeping the cell of the second eNB which the UE has access to and resource configuration at the second eNB side unchanged according to measurement report information of the UE. The first eNB sends a message 1 (RRC connection reconfiguration message) to the UE to instruct the UE to leave the source cell and access to the target cell while keeping the connection and configuration with the second eNB (i.e., secondary eNB). New configuration information is carried in the message.

Herein, the time when the master eNB sends the message 1 to the UE is believed to be the time when the primary cell under the master eNB of the UE in dual connectivity is switched as described in the above methods.

Meanwhile, the first eNB continues to deliver data packets of the shunting Bearer#2 to the second eNB for transmission. The data packets include: PDCP PDUs indicated to be transmitted successfully by an RLC entity of its own, which have not been received yet when the first eNB sends the message 1; PDCP PDUs which have not been transmitted yet in a PDCP entity cache of the source eNB; and PDCP PDUs which are subsequently received newly from an S-GW and processed by a PDCP entity. It should be noted that the network side now still uses the old configuration of the PDCP entity to package the data packets. The second eNB processes the received data packets via a lower level protocol entity and sends them to the UE through a Uu interface.

At step 602: according to the received indication of the message 1, the UE, on the one hand, leaves the source cell and has access to the target cell through a random access procedure (step 602), and on the other hand, the UE still uses the old configuration for each related protocol entity corresponding to the second eNB and the shunting bearer (EPS Bearer#2), and continues to work.

At step 603: after having access to the target cell successfully, the UE sends a message 3 (RRC connection reconfiguration complete message) to the first eNB to indicate that the UE has enabled the new configuration. After receiving the message 3, the first eNB begins to perform transmission scheduling of the user plane for the UE using the new configuration. Herein, the sending of the shunting bearer includes the first eNB sending the EPS bearer through a Uu interface between the target eNB itself and the UE and the first eNB delivering part of the PDCP PDUs to the second eNB for sending. In an exemplary embodiment, if the first eNB is arranged to feed back a PDCP status report after the UE accesses successfully, then the first eNB will perform retransmission or discarding operation of data packets according to feedback information of the status report.

Through the intra-eNB change procedure of the first eNB, the second eNB will first receive the originally configured PDCP PDUs from the first eNB and then receive the newly configured PDCP PDUs, and the second eNB will send these data packets to the UE in order. In order to enable the second eNB to send the received newly configured PDCP PDUs to the UE as soon as possible, the first eNB or the UE may indicate (according to the message 3), to the second eNB through an X2 interface or a Uu interface, the information of the UE enabling the new configuration already. After the second eNB receives this information, its RLC entity cache will discard all of the stored data packets and will not send the data packets any more. The indication information may be a designator of the control plane or user plane.

Embodiment 3

Figure 7:
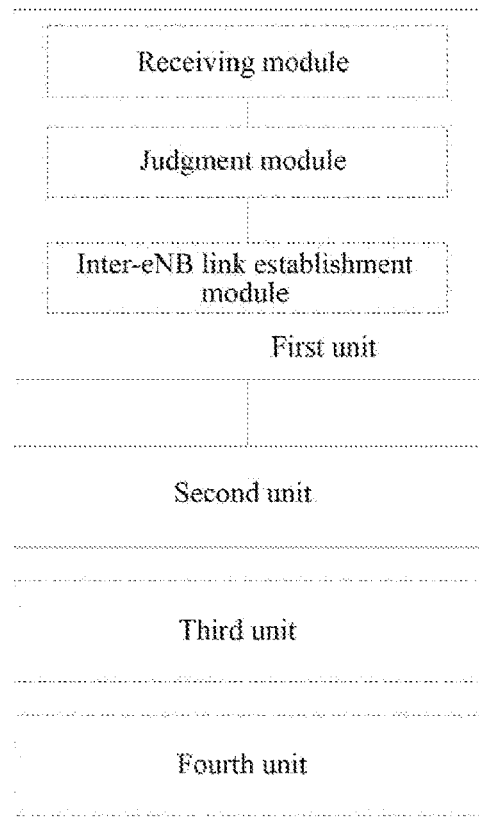
FIG. 7 is a module diagram of an eNB device according to an embodiment of the present disclosure.

The present embodiment provides an eNB device which can implement the method described in the embodiment 1 and includes a first unit and a second unit, as shown in FIG. 7.

The first unit is arranged to, when a master eNB of a UE in dual connectivity is switched to this eNB device, determine that the UE keeps a connection and configuration with a secondary eNB.

Herein, the first unit includes the following modules.

A receiving module is arranged to receive a switching request and secondary eNB information of the UE sent by the master eNB.

The switching request and the secondary eNB information of the UE received by the receiving module may be contained in a switching request message, or the secondary eNB information of the UE may be obtained from a existing eNB configuration updating message sent by the master eNB or a newly-added message.

A judgment module is arranged to judge whether the UE keeps the connection and configuration with the secondary eNB after the switching of the eNB according to the secondary eNB information of the UE, and if yes, determine that the UE keeps the connection and configuration with the secondary eNB when the master eNB of the UE in dual connectivity is switched to this eNB device.

The second unit is arranged to establish a connection with the UE when the UE keeps the connection and configuration with the secondary eNB.

Herein, the second unit is further arranged to perform data scheduling of a user plane for the UE after the second unit establishes a connection with the UE and the UE has had access to the target cell and enabled a new configuration. It should be noted that if the eNB device is arranged to feed back a PDCP status report after the UE accesses successfully, then the second unit will perform the data scheduling of the user plane for the UE only after the PDCP status report is received.

In still further schemes, an inter-eNB link establishment module is added to the eNB device. The module is arranged to, when the judgment module determines that the UE keeps the connection and configuration with the secondary eNB, first establish an interface connection with the secondary eNB and then feed a switching request acknowledgment and indication information for allowing the UE to retain the connection and configuration with the secondary eNB back to the master eNB. In an exemplary embodiment, a switching request acknowledgment message carrying the indication information for allowing the UE to retain the connection and configuration with the secondary eNB may be fed back to the master eNB. The indication information for allowing the UE to retain the connection and configuration with the secondary eNB may also be fed back to the master eNB through other messages. The other detailed operation processes of this module are similar to the corresponding content of the embodiment 1 and will not be repeated herein.

In addition to being used as the target eNB, the eNB device described above may also be used as the master eNB. Therefore, the eNB device further includes a third unit. The third unit is arranged to, when the eNB device itself is the master eNB of the UE in dual connectivity and is switched to the target eNB, receive the indication information for allowing the UE to retain the connection and configuration with the secondary eNB sent by the target eNB, and continue to deliver the originally configured data packets of an shunting bearer to the secondary eNB according to the indication for allowing the UE to retain the connection and configuration with the secondary eNB.

In an exemplary embodiment, the third unit described above is further arranged to send the data packets to the target eNB when continuing to deliver the originally configured data packets of the shunting bearer to the secondary eNB. Or, the third unit is further arranged to first stop sending the data packets to the secondary eNB, and then send the data packets to the target eNB when continuing to deliver the originally configured data packets of the shunting bearer to the secondary eNB until information of the UE enabling the new configuration already is received.

In addition to being used as the target eNB and the master eNB, the eNB device described above may also be used as the secondary eNB. Therefore, the eNB device may further include a fourth unit. The fourth unit is arranged to, when the eNB device itself is the secondary eNB of the UE in dual connectivity, receive the originally configured data packets of the shunting bearer from the master eNB, and then receive newly configured data packets of the shunting bearer from the target eNB and send in order the received data packets to the UE. Herein, when the newly configured data packets of the shunting bearer sent by the target eNB are received, if there are still data packets which are not sent in a cache, then these data packets in the cache are discarded.

Figure 8:
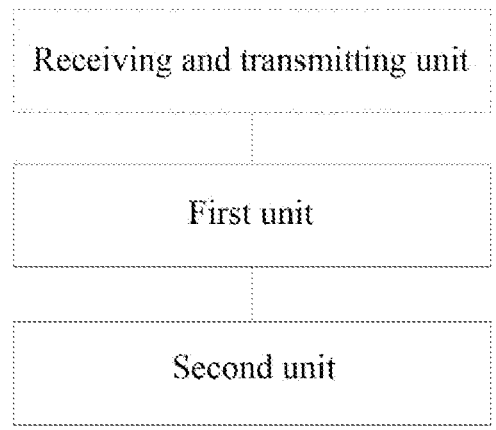
FIG. 8 is a module diagram of a user equipment according to an embodiment of the present disclosure.

In addition, the present embodiment further provides a user equipment, which, as shown in FIG. 8, cooperates with the eNB device described above to implement the methods for switching eNBs in the embodiment 1 described above. The user equipment includes a first unit and a second unit.

The first unit is arranged to, when a master eNB of the user equipment itself is switched, keep a connection and configuration with a secondary eNB in dual connectivity.

The second unit is arranged to establish a connection with a switched target eNB while the first unit keeps the connection and configuration with the secondary eNB.

In practical applications, the user equipment described above further includes a receiving and transmitting unit arranged to receive an RRC connection reconfiguration and an indication for keeping the connection and configuration with the secondary eNB sent by the master eNB. At this time, the first unit is arranged to, when the master eNB of the user equipment itself is switched, keep the connection and configuration with the secondary eNB in dual connectivity according to the indication for keeping the connection and configuration with the secondary eNB; and the second unit is arranged to leave a source cell and access to a target cell according to the RRC connection reconfiguration while the first unit keeps the connection and configuration with the secondary eNB.

Herein, the indication for keeping the connection and configuration with the secondary eNB received by the receiving and transmitting unit may be contained in an RRC connection reconfiguration message or any other message.

In an exemplary embodiment, the receiving and transmitting unit described above is further arranged to, after the user equipment itself has access to the target cell, feed information of enabling a new configuration already back to the master eNB and/or the secondary eNB. The sent information indicating that the new configuration has been enabled already is mainly to instruct indirectly or directly the secondary eNB to discard all of the cached data packets of the master eNB to improve resource utilization of the secondary eNB. The process of instructing indirectly by the master eNB includes the master eNB receiving the information of enabling the new configuration already and sending a termination indication to the secondary eNB according to this information.

It should be noted that although the eNB device and user equipment described above may cooperate to complete the eNB switching procedure, in the practical applications, the eNB device and user equipment described above are independent and are not limited to be used in combination, they can be used separately as well.

Embodiment 4

Figure 9:
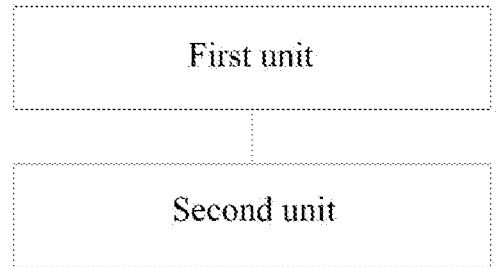
FIG. 9 is a module diagram of another eNB device according to an embodiment of the present disclosure.

The present embodiment provides an eNB device, which, as shown in FIG. 9, may implement the method described in the embodiment 2 and includes a first unit and a second unit.

The first unit is arranged to, when a primary cell under the eNB device of UE in dual connectivity is switched, determine that the UE keeps a connection and configuration with a secondary eNB.

The second unit is arranged to, when the first unit determines that the UE keeps the connection and configuration with the secondary eNB, instruct the UE to leave a source cell and access to a target cell while keeping the connection and configuration with the secondary eNB.

In an exemplary embodiment, the second unit is arranged to send an RRC connection reconfiguration and an indication for keeping the connection and configuration with the secondary eNB to the UE, so as to instruct the UE to leave the source cell and access to the target cell while keeping the connection and configuration with the secondary eNB. The indication for keeping the connection and configuration with the secondary eNB sent by the second unit to the UE may be contained in an RRC connection reconfiguration message or any other message.

Since the eNB device described above may implement the method in the embodiment 2 described above, detailed operations of each of its units are similar to the corresponding content of the embodiment 2 described above and will not be repeated herein.

Figure 10:
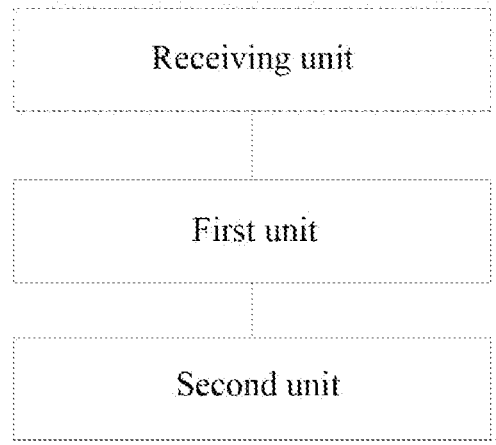
FIG. 10 is a module diagram of another user equipment according to an embodiment of the present disclosure.

The present embodiment will further introduce another user equipment, which cooperates with the eNB device described above to implement the method in the embodiment 2 described above. The user equipment includes a first unit and second unit, as shown in FIG. 10.

The first unit is arranged to, when a primary cell under a master eNB of the user equipment is switched, keep a connection and configuration with a secondary eNB.

The second unit is arranged to leave a source cell and access to a target cell while the first unit keeps the connection and configuration with the secondary eNB.

In an exemplary embodiment, the user equipment further includes a receiving unit arranged to receive an RRC connection reconfiguration and an indication for keeping the connection and configuration with the secondary eNB sent by the master eNB. Thus, the first unit is arranged to keep the connection and configuration with the secondary eNB according to the indication for keeping the connection and configuration with the secondary eNB. The second unit is arranged to leave the source cell and access to the target cell according to the RRC connection reconfiguration message while the first unit keeps the connection and configuration with the secondary eNB.

Herein, the indication for keeping the connection and configuration with the secondary eNB received by the receiving unit may be contained in an RRC connection reconfiguration message received by the receiving unit or any other message.

It should be noted that although the eNB device and user equipment described above may cooperate to complete the eNB switching procedure, in the practical applications, the eNB device and user equipment described above are independent and are not limited to be used in combination, they can be used separately as well.

Those skilled in the art may understand that all or part of steps in the method described above can be carried out by the related hardware through programs, which can be stored in computer readable storage medium, such as read-only memory, magnetic disk or optical disk. In an exemplary embodiment, all or part of steps in the embodiments described above can be carried out using one or more integrated circuits. Accordingly, various modules/units in the embodiments described above can be implemented in a form of hardware, or can be implemented using a form of software functional module. The present disclosure is not limited to the combination of any specific form of hardware and software.

All above is only the alternative embodiments of the present disclosure only and not to limit the protection scope of the present disclosure. Any modification, equivalent substitution and improvement made within the spirit and principle of the present disclosure should be included in the protection scope of the present disclosure.

INDUSTRIAL APPLICABILITY

The technique schemes described above are applicable to all types of eNBs and all types of interfaces with various performances between the eNBs. Using the technical schemes of the present application, in the process of data transmission and/or movement of the UE, when the master eNB which the UE accesses to is changed, the user plane between the UE and the secondary eNB which the UE accesses to will not be interrupted, i.e., the data can be transmitted sequentially. Therefore, the performance and throughput of the UE transmitting data are increased and the utilization efficiency of radio resources is improved.

What we claim is:

1. A method for switching an evolved node B, eNB, by a user equipment, UE, comprising:
   when a master eNB of the UE in dual connectivity is switched, determining, by a target eNB, that the UE keeps a connection and configuration with a secondary eNB; and
   establishing, by the target eNB, a connection with the UE while the UE keeps the connection and configuration with the secondary eNB;
   wherein the target eNB determining that the UE keeps the connection and configuration with the secondary eNB comprises:
   receiving, by the target eNB, a switching request and secondary eNB information of the UE sent by the master eNB, judging whether the UE keeps the connection and configuration with the secondary eNB after switching the eNB according to the secondary eNB information of the UE, and determining that the UE keeps the connection and configuration with the secondary eNB if yes;
   if the target eNB determines that the UE keeps the connection and configuration with the secondary eNB after switching the eNB, then the target eNB first establishing an interface connection with the secondary eNB, and then sending a switching request acknowledgment containing an indication information for allowing the UE to retain the connection and configuration with the secondary eNB back to the master eNB; and
   after receiving the indication information for allowing the UE to retain the connection and configuration with the secondary eNB sent by the target eNB, continuing to deliver, by the master eNB, originally configured data packets of a shunting bearer to the secondary eNB according to the indication information for allowing the UE to retain the connection and configuration with the secondary eNB; wherein the shunting bearer indicates that the master eNB sends part of data packets to the UE and sends the other part of data packets to the secondary eNB, the secondary eNB then sends the other part of data packets to the UE.

2. The method according to claim 1, wherein the target eNB receiving the switching request and the secondary eNB information of the UE sent by the master eNB comprises:
   receiving, by the target eNB, a switching request message sent by the master eNB, wherein the switching request message carries the secondary eNB information of the UE.

3. The method according to claim 1, wherein the target eNB sending the switching request acknowledgment and the indication information for allowing the UE to retain the connection and configuration with the secondary eNB back to the master eNB comprises:
   sending by the target eNB, a switching request acknowledgment message back to the master eNB, wherein the switching request acknowledgment message carries the indication information for allowing the UE to retain the connection and configuration with the secondary eNB.

4. The method according to claim 1, further comprising:
   establishing, by the target eNB, a connection with the UE, and performing data scheduling of a user plane for the UE after the UE has accessed to a target cell and enabled a new configuration, wherein the target eNB performing the data scheduling of the user plane for the UE comprises: the target eNB sending data through a Uu interface between the target eNB and the UE, and the target eNB sending part of packet data convergence protocol, PDCP, data units, PDUs, to the UE though the secondary eNB.

5. The method according to claim 1, further comprising:
   sending, by the master eNB, data packets to the target eNB when the master eNB continues to deliver the originally configured data packets of the shunting bearer to the secondary eNB; or
   continuing, by the master eNB, to deliver the originally configured data packets of the shunting bearer to the secondary eNB until information of the UE enabling a new configuration already is received, then stopping, by the master eNB, sending data packets to the secondary eNB and beginning to send the data packets to the target eNB.

6. The method according to claim 1, further comprising:
receiving, by the secondary eNB, the originally configured data packets of the shunting bearer from the master eNB, and then receiving the newly configured data packets of the shunting bearer from the target eNB; and sending in order, by the secondary eNB, the received data packets to the UE, wherein, the secondary eNB discards the data packets in a cache when the secondary eNB receives newly configured data packets of the shunting bearer sent by the target eNB and there are still data packets which are not sent in the cache.

7. A non-transitory computer storage medium storing computer executable instructions which are used for executing the method according to claim 1.

8. The method according to claim 2, further comprising:
if the target eNB determines that the UE keeps the connection and configuration with the secondary eNB after switching the eNB, then the target eNB first establishing an interface connection with the secondary eNB, and then sending the switching request acknowledgment and indication information for allowing the UE to retain the connection and configuration with the secondary eNB back to the master eNB.

9. An evolved node B, eNB comprising a processor and a memory storing programs, wherein when the programs are executed by the processor, the processor is arranged to:

determine that a user equipment, UE, keeps a connection and configuration with a secondary eNB when a primary cell under the eNB of the UE in dual connectivity is switched, instruct the UE to leave a source cell and access to a target cell and to keep the connection and configuration with the secondary eNB;

send a switching request and information about the secondary eNB of the UE to a target eNB, and receive a switching request acknowledgment for allowing the UE to retain the connection and configuration with the secondary eNB from the target eNB; and continue to deliver originally configured data packets of a shunting bearer to the secondary eNB for allowing the UE to retain the connection and configuration with the secondary eNB; wherein the shunting bearer indicates that the master eNB sends part of data packets to the UE and sends the other part of data packets to the secondary eNB, the secondary eNB then sends the other part of data packets to the UE.

10. The eNB according to claim 9, wherein the processor is arranged to send a radio resource control, RRC, connection reconfiguration and an indication for keeping the connection and configuration with the secondary eNB to the UE.

11. The eNB according to claim 10, wherein the processor is arranged to send an RRC connection reconfiguration message to the UE, wherein the RRC connection reconfiguration message carries the indication for keeping the connection and configuration with the secondary eNB.

* * * * *